US012597703B2

(12) United States Patent
Sung et al.

(10) Patent No.: US 12,597,703 B2
(45) Date of Patent: Apr. 7, 2026

(54) VEHICULAR ANTENNA DEVICE

(71) Applicant: Samsung Electronics Co., Ltd., Suwon-si (KR)

(72) Inventors: Sangbong Sung, Suwon-si (KR); Jinu Kim, Suwon-si (KR); Yongsun Shin, Suwon-si (KR); Jeseung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 18/347,106

(22) Filed: Jul. 5, 2023

(65) Prior Publication Data

US 2023/0352819 A1 Nov. 2, 2023

Related U.S. Application Data

(63) Continuation of application No. PCT/KR2021/017925, filed on Nov. 30, 2021.

(30) Foreign Application Priority Data

Jan. 6, 2021 (KR) ........................ 10-2021-0001478

(51) Int. Cl.
*H01Q 1/32* (2006.01)
*H01Q 9/28* (2006.01)

(52) U.S. Cl.
CPC ........... *H01Q 1/3291* (2013.01); *H01Q 9/285* (2013.01)

(58) Field of Classification Search
CPC ........ H01Q 1/32; H01Q 1/325; H01Q 1/3275; H01Q 1/3291; H01Q 1/38; H01Q 1/46; H01Q 1/48; H01Q 9/28; H01Q 9/285; H01Q 13/10
See application file for complete search history.

(56) References Cited

U.S. PATENT DOCUMENTS

| | | | |
|---|---|---|---|
| 8,004,466 | B2 | 8/2011 | Kim et al. |
| 8,115,681 | B2 | 2/2012 | Ryou et al. |
| 8,203,499 | B2 | 6/2012 | Cozzolino et al. |
| 8,618,985 | B2 | 12/2013 | Park et al. |
| 9,246,215 | B1 | 1/2016 | Lee |
| 10,312,572 | B2 | 6/2019 | Chen |

(Continued)

FOREIGN PATENT DOCUMENTS

| | | | |
|---|---|---|---|
| JP | 2006217511 A | * | 8/2006 |
| JP | 2007043594 A | * | 2/2007 |
| JP | 2007096680 A | * | 4/2007 |

(Continued)

OTHER PUBLICATIONS

International Search Report dated Feb. 28, 2022, issued in International Patent Application No. PCT/ KR2021/017925.

(Continued)

*Primary Examiner* — Tho G Phan
(74) *Attorney, Agent, or Firm* — Jefferson IP Law, LLP

(57) ABSTRACT

A vehicular antenna apparatus is provided. The vehicular antenna apparatus includes a substrate, a dipole-type radiation pattern disposed on a first surface of the substrate and configured to transmit or receive a radio signal, and a coupling pattern disposed on a second surface opposite to the first surface of the substrate and electromagnetically coupled to the radiation pattern.

13 Claims, 12 Drawing Sheets

(56) References Cited

U.S. PATENT DOCUMENTS

| | | | |
|---|---|---|---|
| 2016/0226139 | A1 | 8/2016 | Yu et al. |

FOREIGN PATENT DOCUMENTS

| | | | |
|---|---|---|---|
| JP | 2019-114938 A | | 7/2019 |
| KR | 10-2009-0097458 A | | 9/2009 |
| KR | 10-2009-0118368 A | | 11/2009 |
| KR | 10-2011-0025365 A | | 3/2011 |
| KR | 10-2011-0049564 A | | 5/2011 |
| KR | 10-2011-0109494 A | | 10/2011 |
| KR | 10-1563459 B1 | | 10/2015 |
| KR | 102149598 B1 | * | 8/2020 |
| KR | 10-2252220 B1 | | 5/2021 |

OTHER PUBLICATIONS

Korean Office Action dated Feb. 4, 2025, issued in Korean Application No. 10-2021-0001478.

Korean Office Action dated Oct. 23, 2025, issued in Korean Patent Application No. 10-2021-0001478.

* cited by examiner

VEHICULAR ANTENNA DEVICE

CROSS-REFERENCE TO RELATED APPLICATION(S)

This application is a continuation application, claiming priority under § 365(c), of an International application No. PCT/KR2021/017925, filed on Nov. 30, 2021, which is based on and claims the benefit of a Korean patent application number 10-2021-0001478, filed on Jan. 6, 2021, in the Korean Intellectual Property Office, the disclosure of which is incorporated by reference herein in its entirety.

BACKGROUND

1. Field

The disclosure relates to a vehicular antenna apparatus and a vehicle including the same. More particularly, the disclosure relates to a broadband vehicular antenna apparatus.

2. Description of Related Art

Various features have been developed and applied to further meet the needs of users of vehicles and increase user convenience.

For example, vehicular devices for providing a user with a radio device, a television (TV), content, various types of information necessary for driving, and the like have been developed. Pieces of information that may be provided to a user may be received by a vehicle via wireless communication. In order to provide various pieces of information to the user, the vehicle necessarily needs to be equipped with an antenna for performing wireless communication. The antenna may be installed inside or outside the vehicle.

Wireless communication may be performed by transmitting and receiving signals via various antennas mounted inside the vehicle. Various studies have been attempted to improve radiation performance by efficiently arranging various types of antennas within a limited mounting space and reducing mutual interference therebetween.

In particular, for an internal antenna mounted inside a vehicle, the amount of radio signals that escape from the vehicle from among radio signals radiated by the antenna may be limited due to the effect of a metal body in the vehicle and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna with excellent performance and reduced signal imbalance, and a vehicle including the antenna.

Another aspect of the disclosure is to provide a compact broadband antenna and a vehicle including the same.

Additional aspects will be set forth in part in the description which follows and, in part, will be apparent from the description, or may be learned by practice of the presented embodiments.

In accordance with an aspect of the disclosure, a vehicular antenna apparatus is provided. The vehicular antenna apparatus includes a substrate, a dipole-type radiation pattern disposed on a first surface of the substrate and configured to transmit or receive a radio signal, and a coupling pattern disposed on a second surface opposite to the first surface of the substrate and electromagnetically coupled to the radiation pattern.

Furthermore, the radiation pattern includes first and second radiation patterns spatially spaced apart from each other, and the coupling pattern may be disposed to overlap portions of the first and second radiation patterns in a thickness direction of the substrate.

Also, a similarity between the first radiation pattern and the second radiation pattern may be 80% or higher.

Furthermore, at least one of the first and second radiation patterns includes a first radiation region having a first area, a second radiation region having a second area smaller than the first area, and a third radiation region having one end in contact with the first radiation region and another end in contact with the second radiation region, and the coupling pattern may be disposed not to overlap at least a portion of the first radiation region in the thickness direction of the substrate.

The entire second radiation region of the first radiation pattern and the entire second radiation region of the second radiation pattern may overlap the coupling pattern in the thickness direction of the substrate.

Also, a width of the third radiation region may be less than each of a width of the first radiation region and a width of the second radiation region.

Furthermore, a distance between the second radiation region of the first radiation pattern and the second radiation region of the second radiation pattern may be greater than a distance between the first radiation region of the first radiation pattern and the first radiation region of the second radiation pattern.

The coupling pattern includes a first coupling region overlapping the second radiation region of the first radiation pattern, a second coupling region overlapping the second radiation region of the second radiation pattern, and a third coupling region having one end in contact with the first coupling region and another end in contact with the second coupling region.

Furthermore, the coupling pattern further includes a first slot that spatially separates the first coupling region from the second coupling region.

Also, the first slot may correspond to a distance between the first radiation pattern and the second radiation pattern.

The coupling pattern further includes one or more second slots.

The vehicular antenna further includes one or more slot adjustment elements connected to the coupling pattern across the second slot.

Also, the one or more slot adjustment elements include at least one of an inductor, a capacitor, a switching element, and an impedance tuner and control a length of the second slot.

The vehicular antenna further includes a feed point disposed on a first radiation region of the first radiation pattern, and a ground point disposed on a first radiation region of the second radiation pattern.

Furthermore, a distance between the ground point and a second radiation region of the second radiation pattern may be less than a distance between the feed point and the second radiation region of the first radiation pattern.

A width of an operating frequency at which a peak gain is −3 dB or more may be greater than or equal to 3 giga hertz (GHz).

Also, the peak gain may be −3 dB or more in a frequency range of 1.8 GHz to 5 GHz.

Also, the thickness of the substrate may be less than or equal to 0.5 mm.

Furthermore, the vehicular antenna may be disposed on an inside of the vehicle, the radiation pattern may be disposed toward an outside of the vehicle, and the coupling pattern may be disposed toward the inside of the vehicle.

A vehicle according to an embodiment includes a body, and an antenna including a substrate and a dipole-type radiation pattern and a coupling pattern electromagnetically coupled to the radiation pattern, the radiation pattern and the coupling pattern being separated from each other with the substrate therebetween, and the radiation pattern is disposed toward an outside of the vehicle while the coupling pattern is disposed toward an inside of the vehicle.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
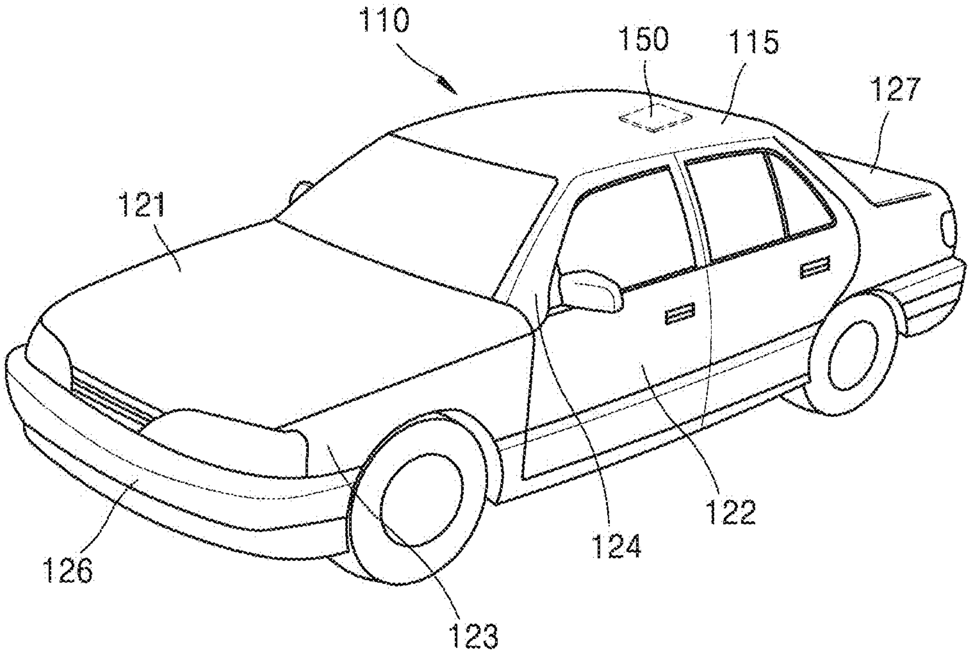
FIG. 1 is a diagram illustrating a vehicle in which an antenna apparatus is installed, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when a part is referred to as being "connected" or "coupled" to another part, it may be "directly connected" to or "electrically coupled" to the other part with one or more intervening elements therebetween. Furthermore, when a part "includes" or "comprises" an element, unless there is a particular description contrary thereto, the part may further include other elements, not excluding the other elements.

Expressions such as "in some embodiments" or "in an embodiment" described in various parts of this specification do not necessarily refer to the same embodiment(s).

Various embodiments may be described in terms of functional block components and various processing operations. Some or all of such functional blocks may be implemented by any number of hardware and/or software components that execute specific functions. In an example, functional blocks of the disclosure may be implemented by one or more microprocessors or by circuit components for performing intended functions. Furthermore, for example, functional blocks according to the disclosure may be implemented with various programming or scripting languages. The functional blocks may be implemented using various algorithms executed by one or more processors. The disclosure may employ techniques of the related art for electronics configuration, signal processing, and/or data processing. Terms such as module and configuration may be used in a broad sense and are not limited to mechanical or physical components.

Additionally, connecting lines or connectors between components shown in figures are only intended to represent functional connections and/or physical or logical couplings therebetween. In an actual apparatus, connections between components may be represented by many alternative or additional functional connections, physical connections, or logical connections.

In addition, the expression 'at least one of A, B, and C' indicates any one of 'A', 'B', 'C', 'A and B', 'A and C', 'B and C', and 'A, B and C'.

A vehicular antenna apparatus and a vehicle according to embodiments of the disclosure will be described in detail with reference to the accompanying drawings. In the accompanying drawings, the same components are illustrated using the same reference symbols. Also, throughout the detailed description, the same components are referred to by the same terms.

A location where an antenna apparatus according to an embodiment of the disclosure is installed is described in detail below with reference to FIG. 1.

FIG. 1 is a diagram illustrating a vehicle in which an antenna apparatus is installed, according to an embodiment of the disclosure.

A vehicular antenna apparatus according to an embodiment of the disclosure may be positioned outside or inside the vehicle.

Specifically, a vehicular antenna apparatus may be installed in a shark-fin module located on glass or a roof that is outside the vehicle.

The vehicular antenna apparatus according to the embodiment of the disclosure may be installed inside a body of the vehicle. When an antenna is installed on glass of the vehicle, the glass may be broken due to an external impact, which may also damage the antenna, and a length of a cable connecting the antenna to a printed circuit board (PCB) module may be increased. When two or more antennas are installed or mounted on the glass to support diversity, there may be issues related to isolation between the antennas. Furthermore, because the shark-fin module has a shape exposed to the outside of the vehicle, there is also a risk of damage due to external impacts. Due to a small size of the shark-fin module, the size of the antenna may also be reduced, which may degrade the antenna's radiation capability (or broadcast reception capability), and when multiple antennas need to be installed to receive various broadcast signals, the number of shark-fin modules may be increased. When the vehicular antenna apparatus is installed inside the body of the vehicle, it is not exposed to the outside of the vehicle, unlike antennas installed on the glass or in the shark-fin module. Therefore, the risk of breakage may be reduced.

Hereinafter, a case where a vehicular antenna apparatus is installed inside a vehicle is described and illustrated.

Referring to FIG. 1, an antenna apparatus (not shown) may be installed on a bottom of a region 150 on a top panel 115 forming a body of a vehicle 110. Specifically, the region 150 of a metal panel (e.g., the top panel 115) may be opened so that the antenna apparatus may be disposed inside the vehicle on the bottom of the region 150. In an embodiment, the region 150 may not include a metallic material. In detail, the region 150 on the metal panel (e.g., the top panel 115) may be formed of a material (e.g., a non-metallic material) that does not block radio waves.

In another embodiment, while FIG. 1 illustrates the case where the antenna apparatus is installed in the region 150 of an upper part of the vehicle 110, which is the inside of the vehicle 110, the antenna apparatus may be installed anywhere if a shape thereof allows mounting inside or outside of the vehicle 110.

The antenna apparatus may be installed on a bottom or an inner region of at least one of a bonnet panel 121, a door panel 122, a fender panel 123, a pillar panel 124, a roof panel 115, a bumper panel 126, and a trunk panel 127 of the vehicle.

The door panel 122 may include not only a driver-side front door panel shown in FIG. 1, but also a driver-side rear door panel, a passenger-side front door panel, and a passenger-side rear door panel. In an embodiment, the fender panel 123 may include not only a driver-side front fender panel shown in FIG. 1, but also a driver-side rear fender panel, a passenger-side front fender panel, and a passenger-side rear fender panel. In another embodiment, the pillar panel 124 may include not only a driver-side front pillar panel shown in FIG. 1, but also a driver-side rear pillar panel, a passenger-side front pillar panel, and a passenger-side rear pillar panel. In addition, the bumper panel 126 may include a rear bumper panel as well as a front bumper panel shown in FIG. 1.

Figure 2:
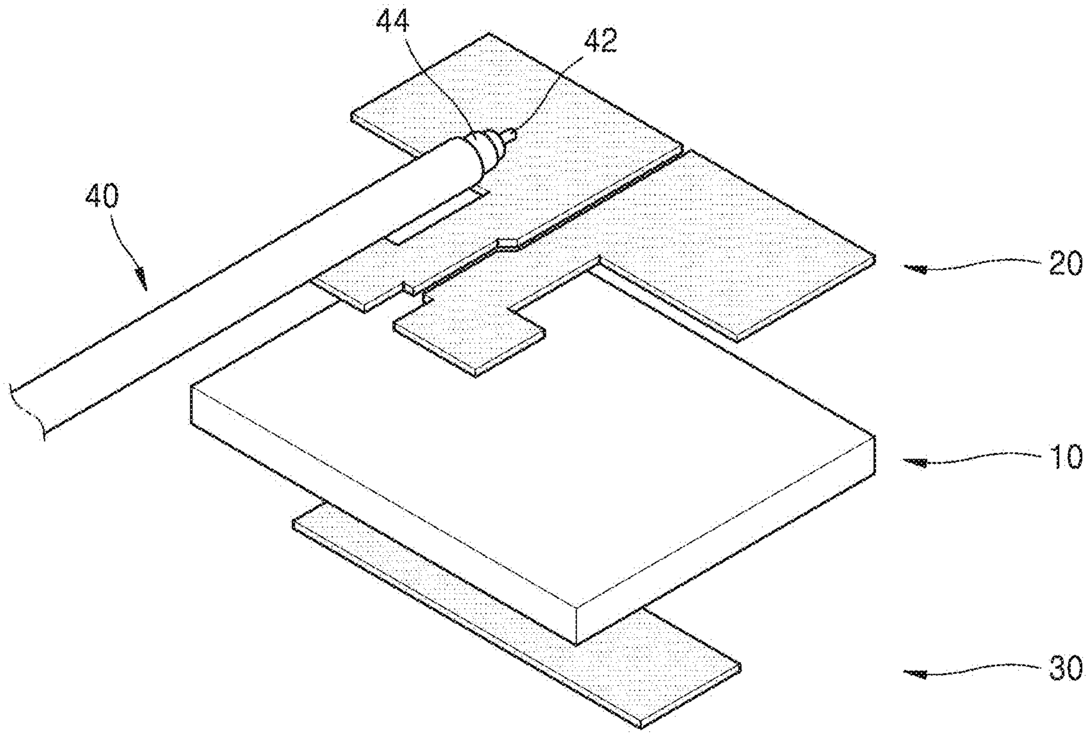
FIG. 2 is an exploded perspective view of an antenna according to an embodiment of the disclosure.
Figure 3A:
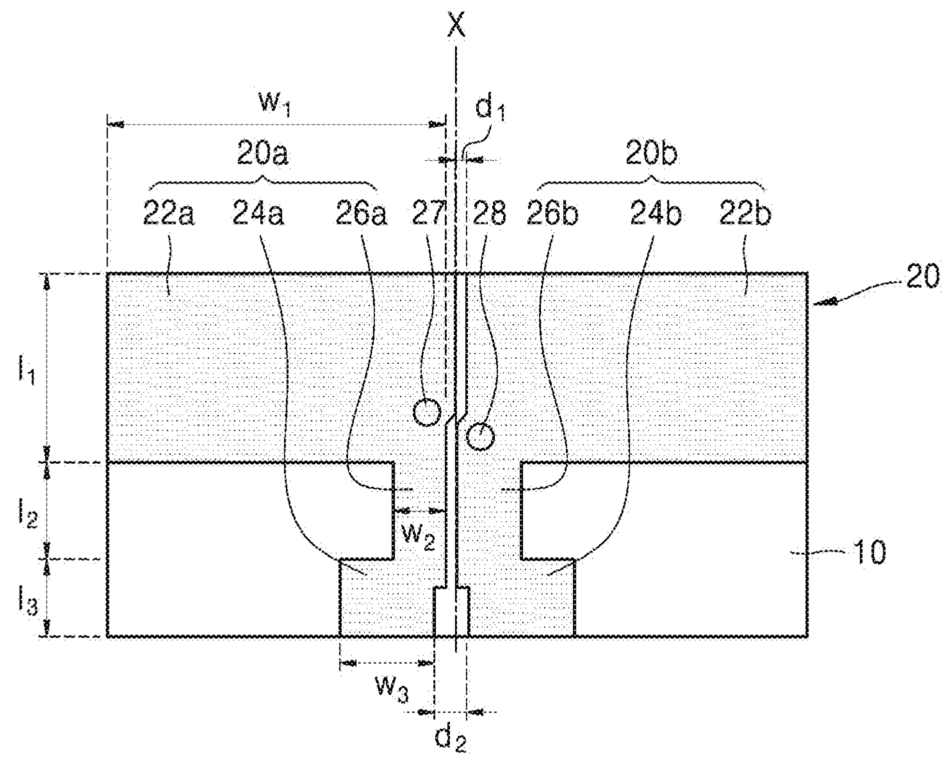
FIG. 3A illustrates a front of an antenna shown in FIG. 2 according to an embodiment of the disclosure.
Figure 3B:
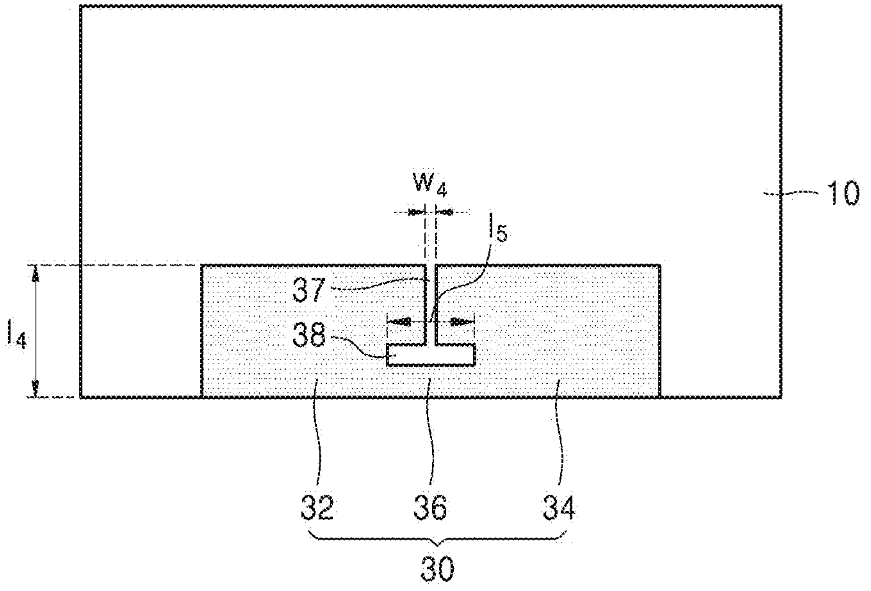
FIG. 3B illustrates a rear of an antenna shown in FIG. 2 according to an embodiment of the disclosure.

FIG. 2 is an exploded perspective view of an antenna 1 according to an embodiment of the disclosure, FIG. 3A illustrates a front of the antenna 1 shown in FIG. 2 according to an embodiment of the disclosure, and FIG. 3B illustrates a rear of the antenna 1 shown in FIG. 2 according to an embodiment of the disclosure.

Referring to FIGS. 2, 3A, and 3B, the antenna 1 may include a substrate 10, a dipole-type radiation pattern 20 disposed on a first surface of the substrate 10, and a coupling pattern 30 disposed on a second surface of the substrate 10 and electromagnetically coupled to the radiation pattern 20. In another embodiment, the antenna 1 may further include a feed line 40 for feeding the radiation pattern 20.

The radiation pattern 20 transmits or receives radio signals, and when the antenna 1 is disposed on the body of the vehicle 110, the radiation pattern 20 may be disposed toward the outside of the vehicle 110, and the coupling pattern 30 may be disposed toward the inside of the vehicle 110. In an example, when the antenna 1 is positioned within the top panel 115 of the vehicle 110, the radiation pattern 20 may be disposed toward the upper part of the vehicle 110, and the coupling pattern 30 is disposed toward a lower part of the vehicle 110.

In yet another embodiment, the substrate 10 may be made of a dielectric material. The substrate 10 may have a thickness such that the coupling pattern 30 may be coupled to the radiation pattern 20. In another example, the thickness of the substrate 10 may be about 0.1 mm to about 0.5 mm. A dielectric constant of the substrate 10 may range from about 1 to about 4 or more.

The radiation pattern 20 may be disposed on the first surface of the substrate 10. In another embodiment, the radiation pattern 20 may be made of a conductive material. In still another embodiment, the radiation pattern 20 may include first and second radiation patterns 20*a* and 20*b* spatially spaced apart from each other on the first surface of the substrate 10. A distance $d_1$ between the first and second radiation patterns 20*a* and 20*b* may be a distance at which the first radiation pattern 20*a* and the second radiation pattern 20*b* may be coupled. For example, the distance $d_1$ between the first and second radiation patterns 20*a* and 20*b* may be about 0.1 mm to about 0.5 mm.

In an embodiment, the first radiation pattern 20*a* may include a feed point 27 connected to a feed conductor 42, and the second radiation pattern 20*b* may include a ground point 28 connected to a ground conductor 44. One of the first and second radiation patterns 20*a* and 20*b* may be connected to the feed conductor 42.

The first and second radiation patterns 20*a* and 20*b* may have a symmetrical structure. In another embodiment, the first and second radiation patterns 20*a* and 20*b* may be symmetric about a central axis X of the antenna 1. Even when a similarity between the first and second radiation patterns 20*a* and 20*b* is 80% or higher, it may be referred to as a symmetrical structure. This is because the structures of the first and second radiation patterns 20*a* and 20*b* may be slightly different for impedance matching adaptive to an external environment.

The first radiation pattern 20*a* may include first to third radiation regions 22*a*, 24*a*, and 26*a* having different dimensions. In an example, the dimensions of the first to third radiation regions 22*a*, 24*a*, and 26*a* may correspond to quarter wavelengths of radio signals resonating in each of the first to third radiation regions 22*a*, 24*a*, and 26*a*.

The first radiation region 22*a* may have a first area, and the second radiation region 24*a* may have a second area and be spaced apart from the first radiation region 22*a*. In another embodiment, the third radiation region 26*a* may be positioned between the first radiation region 22*a* and the second radiation region 24*a* and have a third area. In yet another embodiment, the third radiation region 26*a* may have one end in contact with the first radiation region 22*a* and the other end in contact with the second radiation region 24*a*.

Each of the first to third radiation regions 22*a*, 24*a*, and 26*a* may have a polygonal shape. However, it is not limited thereto. Each of the first to third radiation regions 22*a*, 24*a*, and 26*a* may have a polygonal shape, an elliptical shape, a circular shape, or a modified shape thereof. In another embodiment, each of the first to third radiation regions 22*a*, 24*a*, and 26*a* may have a length l and a width W in similar ranges. For example, a ratio of width W to length l of each of the first to third radiation regions 22*a*, 24*a*, and 26*a* may be 0.5 to 2. Each of the first to third radiation regions 22*a*, 24*a*, and 26*a* may be of a patch type. Because the first radiation pattern 20*a* is compact, the overall size of the antenna 1 may be reduced.

In addition, a width $W_3$ of the third radiation region 26*a* may be less than a width $W_1$ of the first radiation region 22*a* and a width $W_2$ of the second radiation region 24*a*. Thus, because the first to third radiation regions 22*a*, 24*a*, and 26*a* are clearly distinguished from one another, radio signals in various frequency bands resonate in the radiation pattern 20, so that a broadband antenna may be implemented.

The operating frequency may vary depending on lengths $l_1$, $l_2$, and $l_3$, the widths $W_1$, $W_2$, and $W_3$, materials, etc. of the first to third radiation regions 22*a*, 24*a*, and 26*a*.

The second radiation pattern 20*b* may also include first to third radiation regions 22*b*, 24*b*, and 26*b* having different dimensions. In another embodiment, the first radiation region 22*b* may have a first area, and the second radiation region 24*b* may have a second area and be spaced apart from the first radiation region 22*b*. The third radiation region 26*b* is positioned between the first radiation region 22*b* and the second radiation region 24*b* and may have a third area. In yet another embodiment, the third radiation region 26*b* may have one end in contact with the first radiation region 22*b* and the other end in contact with the second radiation region 24*b*. Because the second radiation pattern 20*b* has a structure symmetrical to the first radiation pattern 20*a*, a detailed description thereof will be omitted below.

Because the radiation pattern includes radiation regions of various dimensions, radio signals with various frequencies may resonate. In an example, radio signals may resonate in the first radiation regions 22*a* and 22*b*, the second radiation regions 24*a* and 24*b*, the third radiation regions 26*a* and 26*b*, a region corresponding to the sum of the first and third radiation regions 22*a*, 22*b*, 26*a* and 26*b*, a region corresponding to the sum of the second and third radiation regions 24*a*, 24*b*, 26*a*, and 26*b*, and a region corresponding to the sum of the first to third radiation regions 22*a*, 22*b*, 24*a*, 24*b*, 26*a*, and 26*b*.

The antenna 1 may further include the feed line 40 including the feed conductor 42 and the ground conductor 44.

Referring to FIG. 2, the feed line 40 may be a coaxial cable. An inner core conductor of the coaxial cable may be the feed conductor 42, and an outer core conductor of the coaxial cable may be the ground conductor 44. However, it is not limited thereto. Other feed lines such as a microstrip or strip line, a coplanar waveguide (CPW) line, or a slot line may be used as the feed line 40.

In an embodiment, the feed conductor 42 of the feed line 40 may be connected to the first radiation pattern 20*a* at the feed point 27, and the ground conductor 44 may be connected to the second radiation pattern 20*b* at the ground point 28. In another embodiment, the feed point 27 is disposed on the first radiation region 22*a* having a largest area in the first radiation pattern 20*a* to facilitate supply of current to the first radiation pattern 20*a*. The ground point 28 may also be disposed on the first radiation region 22*b* having a largest area in the second radiation pattern 20*b*.

The feed point 27 and the ground point 28 may not be symmetrically disposed about the central axis X of the antenna 1. In order to alleviate signal imbalance caused by a leakage current in the feed line 40, the ground point 28 may be located to be closer to the second radiation region 24*b* of the second radiation pattern 20*b* than the feed point 27 is to the second radiation region 24*a*. A distance between the ground point 28 and the second radiation region 24*b* of the second radiation pattern 20*b* may be less than a distance between the feed point 27 and the second radiation region 24*a* of the first radiation pattern 20*a*.

In yet another embodiment, the feed line 40 is connected to the first radiation region 22*a* having the largest area, but a position of the feed line 50 may be shifted to optimize impedance matching. For example, when the sum of the areas of the second radiation region 24*a* and the third radiation region 26*a* of the first radiation pattern 20*a* is greater than the area of the first radiation region 22*a*, the feeding point 27 may be disposed in the second radiation region 24*a* of the first radiation pattern 20*a*.

The first radiation pattern 20*a* is connected to the feed conductor 42 of the feed line 40, and the second radiation pattern 20*b* is connected to the ground conductor 44 of the feed line 40, and it is desirable that the current flowing through the feed conductor 42 has the same magnitude as the current flowing through the grounding conductor 44. In an embodiment, leakage current may occur between the second radiation pattern 20*b* and the ground conductor 44 of the feed line 40. This leakage current may create a number of additional radiation sources that are combined in the radiation pattern 20. In another embodiment, this may cause an increase in the number of directionality and cross-polarization of the antenna 1 and deformation of a shape of the radiation pattern 20. A separate device called a balun may be used to eliminate such leakage current or signal imbalance.

A balun may be inserted between the feed line 40 and the antenna 1. In an example, various baluns may be used, such as folded baluns, sleeve baluns, split coax baluns, half-wavelength baluns, or candelabra baluns. The balun incurs additional costs, and when the balun is inserted into the antenna 1, the shape of the radiation pattern 20 or the directivity may be further deformed due to an interaction between the antenna 1 and the balun.

In the antenna 1 according to an embodiment, the coupling pattern 30 may eliminate signal imbalance in the radiation pattern 20 without an additional balun. In another embodiment, the coupling pattern 30 may be disposed on a second surface opposite to the first surface of the substrate 10. Because the coupling pattern 30 needs to be electromagnetically coupled to the radiation pattern 20, the coupling pattern 30 may also be formed of a conductive material like the radiation pattern 20. In still another embodiment, the coupling pattern 30 may be formed of a material that is the same as or different from that of the radiation pattern 20. When the coupling pattern 30 is formed of a material different from that of the radiation pattern 20, it may be formed of a material having lower electrical conductivity than the radiation pattern 20.

At least a portion of the coupling pattern 30 may overlap the radiation pattern 20 in a thickness direction of the substrate 10.

Referring to FIG. 3B, the coupling pattern 30 may be disposed to overlap all of the second radiation regions 24*a* and 24*b* of the radiation pattern 20, overlap portions of the third radiation regions 26*a* and 26*b* of the radiation pattern 20, and not overlap the first radiation regions 22*a* and 22*b* of the radiation pattern 20. The degree of overlap between the coupling pattern 30 and the radiation pattern 20 may be adjusted to alleviate signal imbalance.

In an embodiment, the coupling pattern 30 may include a first coupling region 32 overlapping the first radiation pattern 20*a*, a second coupling region 34 overlapping the second radiation pattern 20*b*, and a third coupling region 36 positioned between the first coupling region 32 and the second coupling region 34. In another embodiment, the first coupling region 32 may overlap the entire second radiation region 24*a* of the first radiation pattern 20*a* in the thickness direction of the substrate 10, and the second coupling region 34 may overlap the entire second radiation region 24*b* of the second radiation pattern 20*b* in the thickness direction of the substrate 10. However, the third coupling region 36 may not overlap any of the first radiation region 22*a* of the first radiation pattern 20*a* and the first radiation region 22*b* of the second radiation pattern 20*b*.

In yet another embodiment, the first coupling region 32 and the second coupling region 34 may also have a structure symmetrical about the central axis X of the antenna 1. While the first and second coupling regions 32 and 34 may be perfectly symmetrical about the central axis X of the antenna 1, they may also be referred to as being symmetrical even when a similarity between the first coupling region 32 and the second coupling region 34 is 80% or higher.

In still another embodiment, the third coupling region 36 may be positioned between the first coupling region 32 and the second coupling region 34 and have one end connected to the first coupling region 32 and the other end connected to the second coupling region 34. The third coupling region 36 may connect the first and second coupling regions 32 and 34 to facilitate flow of current. The third coupling region 36 may be defined as a region that does not overlap the first and second radiation patterns 20*a* and 20*b*.

The coupling pattern 30 may further include one or more slots 37 and 38. In an example, the coupling pattern 30 may include a first slot 37 disposed on the central axis X of the antenna 1 to separate the first coupling region 32 from the second coupling region 34, and a second slot 38 positioned between the first slot 37 and the third coupling region 36.

The first slot 37 may have one end open at an edge of the coupling pattern 30 and the other end connected to the second slot 38. In another embodiment, the second slot 38 may have a side end connected to the first slot 37 and two opposite ends respectively closed by the first and second coupling regions 32 and 34.

A width $W_4$ of the first slot 37 is sufficiently small such that coupling region 32 and the second coupling region 34 may be coupled. For example, the width $W_4$ of the first slot 37 may be about 0.1 mm to about 0.5 mm. However, it is not limited thereto. In an embodiment, because the first coupling region 32 and the second coupling region 34 are connected by the third coupling region 36, the width $W_4$ of the first slot 37 may be 0.5 mm or more.

A size of the second slot 38 may vary according to a resonant frequency. The size of the second slot 38 will be described later.

For example, in order for the first and second radiation patterns 20*a* and 20*b* to be smoothly coupled with the coupling pattern 30, a distance $d_2$ between the second radiation region 24*a* of the first radiation pattern 20*a* and the second radiation region 24*b* of the second radiation pattern 20*b* may be greater than the distance $d_1$ between the third radiation region 26*a* of the first radiation pattern 20*a* and the third radiation region 26*a* of the second radiation pattern 20*b*. A current may flow from the second radiation region 24*a* of the first radiation pattern 20*a* to the first coupling region 32 due to coupling, and then flow through the third coupling region 36 and the second coupling region 34 into the second radiation region 24*b* of the second radiation pattern 20*b* due to coupling.

In another embodiment, the coupling pattern 30 may facilitate current flow between the first radiation pattern 20*a* and the second radiation pattern 20*b*, thereby eliminating signal imbalance. In addition, the coupling pattern 30 may be arranged to overlap the radiation pattern 20 on the substrate 10, allowing for implementation of the antenna 1 with a compact size.

In order to eliminate signal imbalance, the coupling pattern 30 may overlap the radiation pattern 20 to a greater degree.

Figure 4:
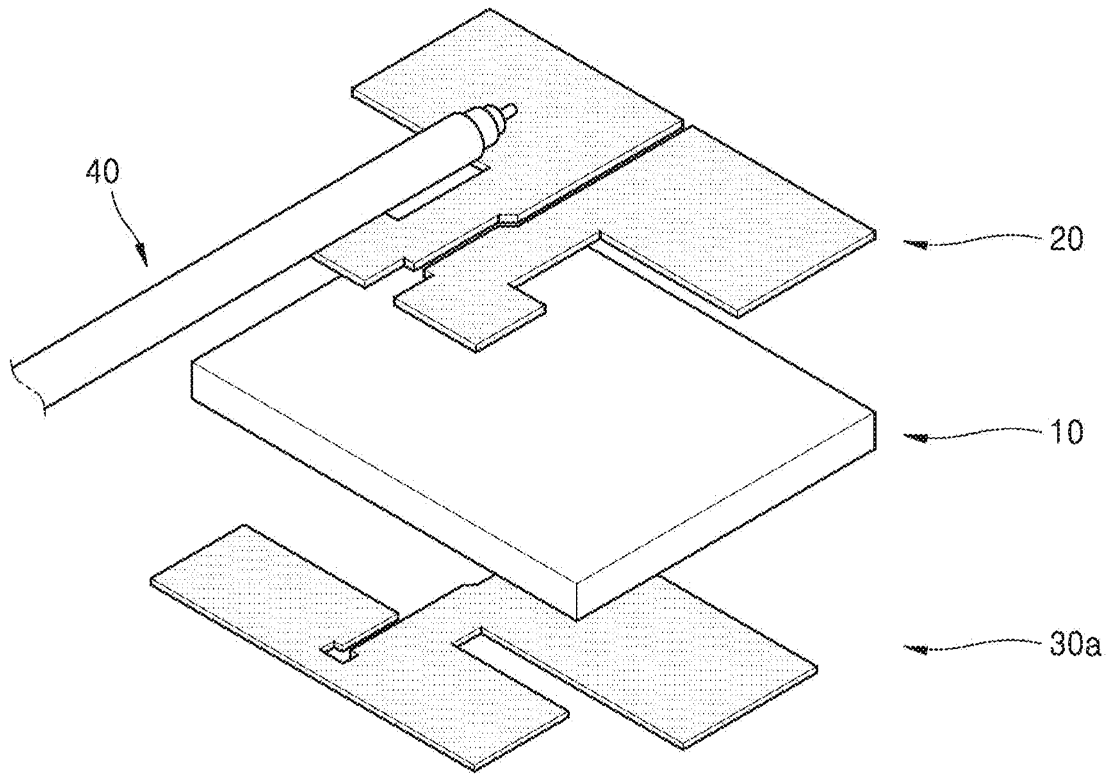
FIG. 4 is a diagram illustrating a coupling pattern according to an embodiment of the disclosure.

FIG. 4 is a diagram illustrating a coupling pattern according to an embodiment of the disclosure.

When compared to a coupling pattern 30 shown in FIG. 2, a coupling pattern 30*a* shown in FIG. 4 may overlap the entire second radiation pattern 20*b*. In detail, the coupling pattern 30*a* may include a first coupling region 32 overlapping the entire second radiation region 24*a* of the first radiation pattern 20*a*, a second coupling region 34*a* overlapping the entire second radiation pattern 20*b*, and a third coupling region 36 connecting the first coupling region 32 and the second coupling region 34*a*.

Because the second coupling region 34*a* overlaps the entire second radiation pattern 20*b*, signal imbalance may be further alleviated.

The antennas 1 and 1*a* according to embodiments were simulated using the HFSS™ 3D electromagnetic simulation tool. Some relevant dimensions are shown below.

Thickness of substrate 10: about 0.2 mm

Figure 5:
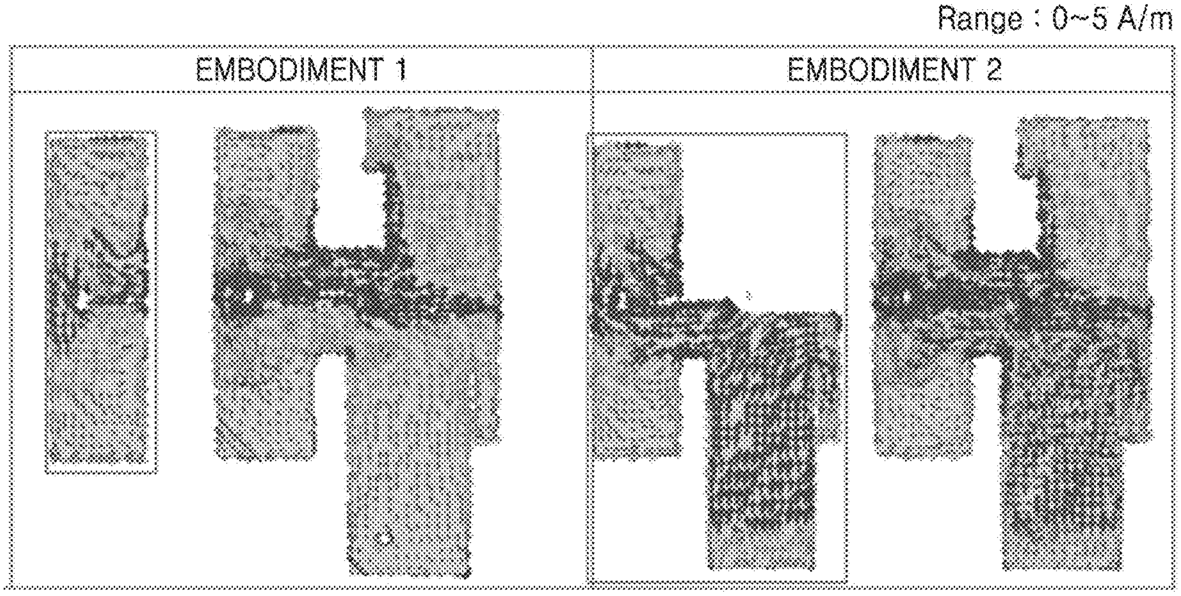
FIG. 5 is a diagram illustrating a current distribution on an antenna according to an embodiment of the disclosure.

Thickness of radiation pattern 20 and coupling pattern 30: about 0.15 mm Maximum width of first radiation region 22*a*: about 31.87 mm Length of first radiation region 22*a:* 15.5 mm Length of second radiation region 24*a:* 7 mm Width of second radiation region 24*a:* 7 mm Length of third radiation region 26*a:* 8.5 mm Width of third radiation region 26*a:* 6 mm
Width of coupling pattern 30: 38 mm
Length of coupling pattern 30: 11 mm
Maximum length of coupling pattern 30*a:* 47 mm FIG. 5 is a diagram illustrating a current distribution on an antenna according to an embodiment of the disclosure.

Referring to FIG. 5, current flows through coupling patterns 30 and 30*a*. It can also be seen that current density increases in the second and third radiation regions 24*a*, 24*b*, 26*a*, and 26*b* as well due to the coupling pattern 30. In addition, it may be seen that when the coupling pattern 30*a* overlaps the second radiation pattern 20*b*, the current density also increases in the first radiation region 22*b* of the second radiation pattern 20*b*.

Figure 6:
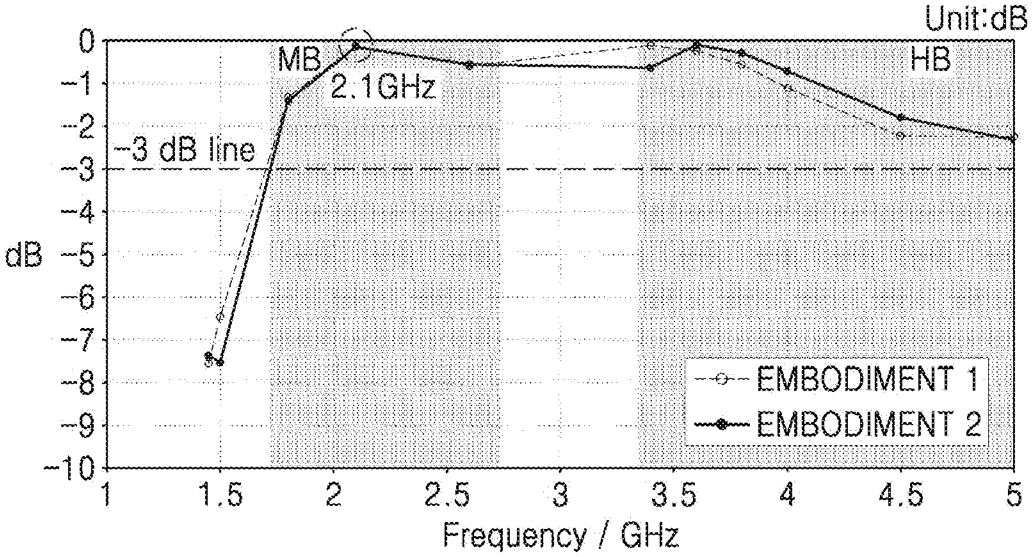
FIG. 6 is a graph illustrating a peak gain response of an antenna according to an embodiment of the disclosure.

FIG. 6 is a graph illustrating a peak gain response of an antenna according to an embodiment of the disclosure.

Referring to FIG. 6, it may be seen that a width W of a frequency over which the antennas 1 and 1*a* according to the embodiments achieve a peak gain of −3 dB or more is greater than or equal to 3 GHz, and a frequency range in which the peak gain of −3 dB or more is obtained is 1.7 GHz to 5 GHz. Because the above frequency range corresponds to long-term evolution (LTE) Band 3 (1710 MHz to 1880 MHz) to new radio (NR) band (sub-6 GHz fifth-generation (5G) band), it may be seen that the antenna 1 according to an embodiment can operate in a wideband frequency band.

Figure 7:
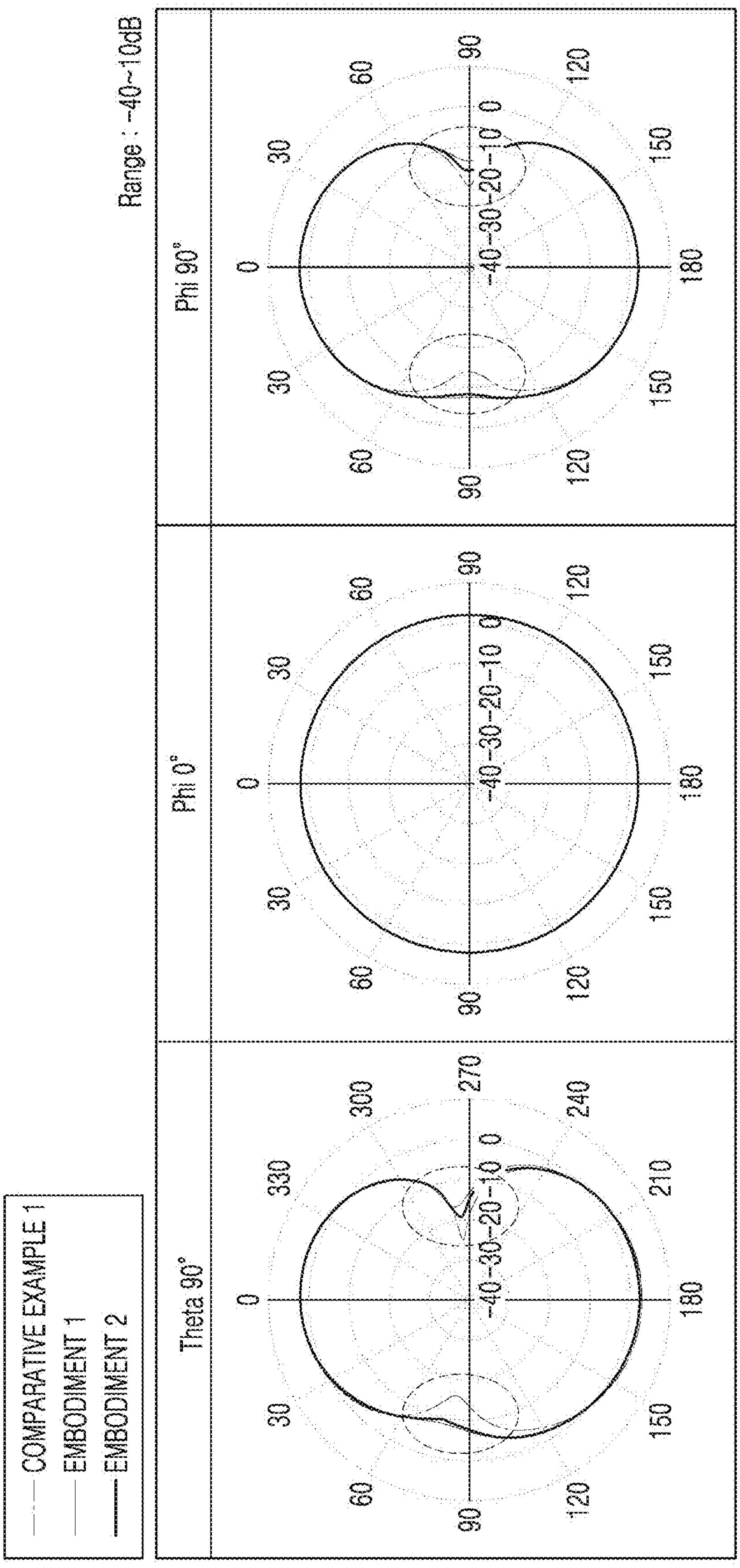
FIG. 7 is a diagram illustrating a radiation pattern of radio signals output from an antenna according to an embodiment of the disclosure.

FIG. 7 is a diagram illustrating a radiation pattern of radio signals output from an antenna according to an embodiment of the disclosure.

As a result of measuring a radiation pattern of a radio signal from an antenna according to an embodiment at 2.1 GHz where the peak gain is highest, it may be seen that the radiation pattern is improved at Theta=90° and Phi=90° compared to an antenna with a balun (comparative example). This means that the antennas 1 and 1*a* having the coupling patterns according to an embodiment exhibit reduced signal imbalance.

In another embodiment, the coupling pattern 30 may be modified according to impedance matching, an operating frequency range, etc.

Figure 8:
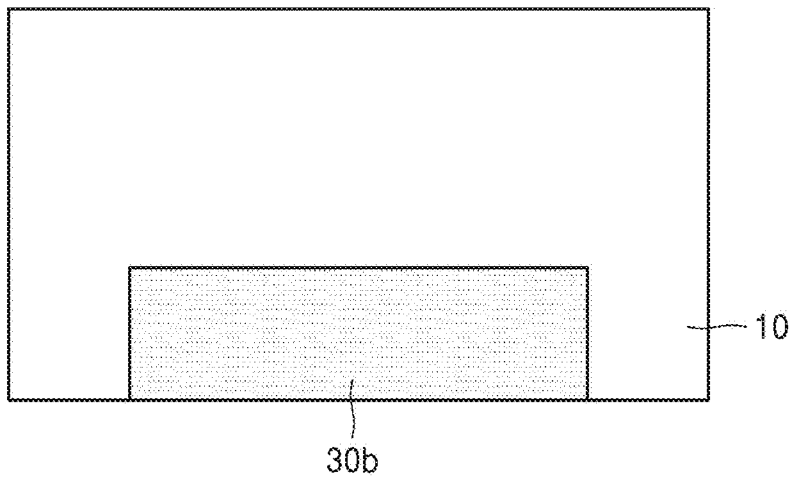
FIG. 8 is a diagram illustrating a coupling pattern according to an embodiment of the disclosure.

FIG. 8 is a diagram illustrating a coupling pattern according to an embodiment of the disclosure.

Referring to FIG. 8, a coupling pattern 30*b* may not include a slot. In order for the coupling between the coupling pattern 30*b* and the radiation pattern 20 to proceed more smoothly, a distance between the coupling pattern 30*b* and the radiation pattern 20, i.e., the thickness of the substrate 10, may be less than the distance between 20*a* and the second radiation pattern 20*b*.

Figure 9:
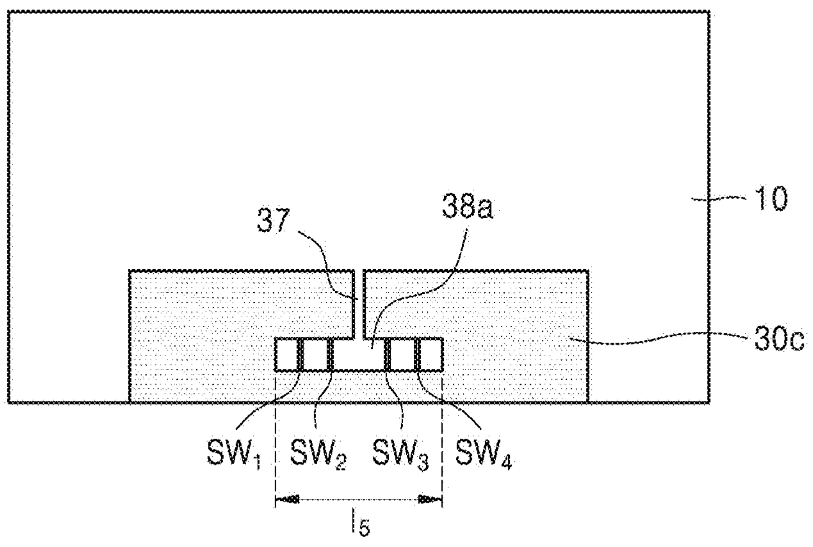
FIG. 9 is a diagram illustrating a coupling pattern including a second slot with an adjustable length, according to an embodiment of the disclosure.

FIG. 9 is a diagram illustrating a coupling pattern including a second slot with an adjustable length, according to an embodiment of the disclosure.

In an embodiment, a coupling pattern 30*c* may include a first slot 37 and a second slot 38*a*. The antenna may further include one or more switching elements SW electrically connected to the coupling pattern 30*c* across the second slot 38*a*. A length of the second slot 38*a* may be adjusted in response to an on/off state of a switching element SW.

Referring to FIG. 9, four switching elements SW1, SW2, SW3, and SW4 electrically connected to the coupling pattern 30*c* across the second slot 38*a* may be disposed on the coupling pattern 30*c*. When the four switching elements SW1, SW2, SW3, and SW4 are all in the off state, an operating range of the coupling pattern 30*c* may be the size of the coupling pattern 30*c* itself.

In another embodiment, when two of the four switching elements are off and the other two switching elements are on, the operating size of the coupling pattern 30*c* may be greater than the size of the coupling pattern 30 itself. For example, when the first and fourth switching elements SW1 and SW4 are turned on and the second and third switching elements SW2 and SW3 are turned off, a length 15 of the second slot 38*a* becomes the distance from the first switching element to the third switching element, and the operating size of the coupling pattern 30*c* becomes larger. As the operating size of the coupling pattern 30 is changed, the resonant frequency of the antenna 1 may also be changed.

In still another embodiment, the length of the second slot is adjusted by the switching element SW, the switching element may be referred to as a slot adjusting element. Slot adjustment elements may include a capacitor, an inductor, etc., in addition to switching elements, and may also include an impedance tuner.

Figure 10:
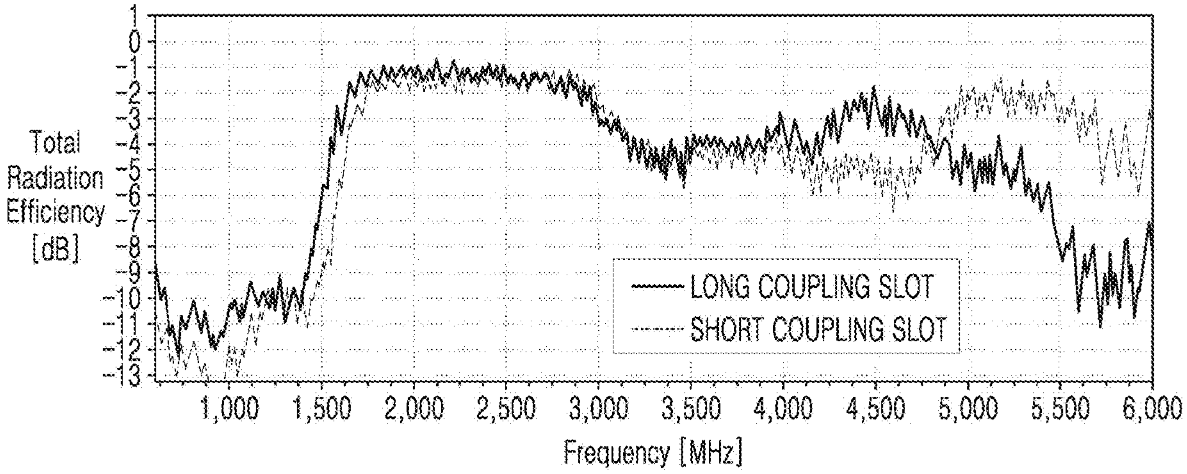
FIG. 10 is a graph of antenna efficiency with respect to a length of a second slot according to an embodiment of the disclosure.

FIG. 10 is a graph of antenna efficiency with respect to a length of a second slot according to an embodiment of the disclosure.

Referring to FIG. 10, it may be seen that a peak gain varies according to the length of the second slot 38*a* at an operating frequency of 4000 MHz or higher. For example, it may be seen that the peak gain in a high frequency band increases as the length of the second slot 38*a* decreases. Because a peak gain in a specific frequency band increases according to the length of the second slot 38*a*, the length of the second slot 38*a* may be adjusted according to a frequency of interest.

In another embodiment, because the length of the second slot 38*a* may be easily adjusted by an operation of a slot adjusting element disposed across the second slot 38*a* (e.g., on/off operation of the switching element), an operating frequency of the antenna 1 may also be easily adjusted.

Although it has been described that the second slot 38*a* is connected to the first slot 37, it is not limited thereto. In another embodiment, the second slot 38*a* for adjusting the operating frequency may be disposed in at least one of the radiation pattern 20 and the coupling pattern 30, and a plurality of second slots may be provided. A switching element may be connected to the first slot 37 without a separate second slot 38 to adjust the length of the first slot 37.

An antenna according to an embodiment may include one or more holes H.

Figure 11:
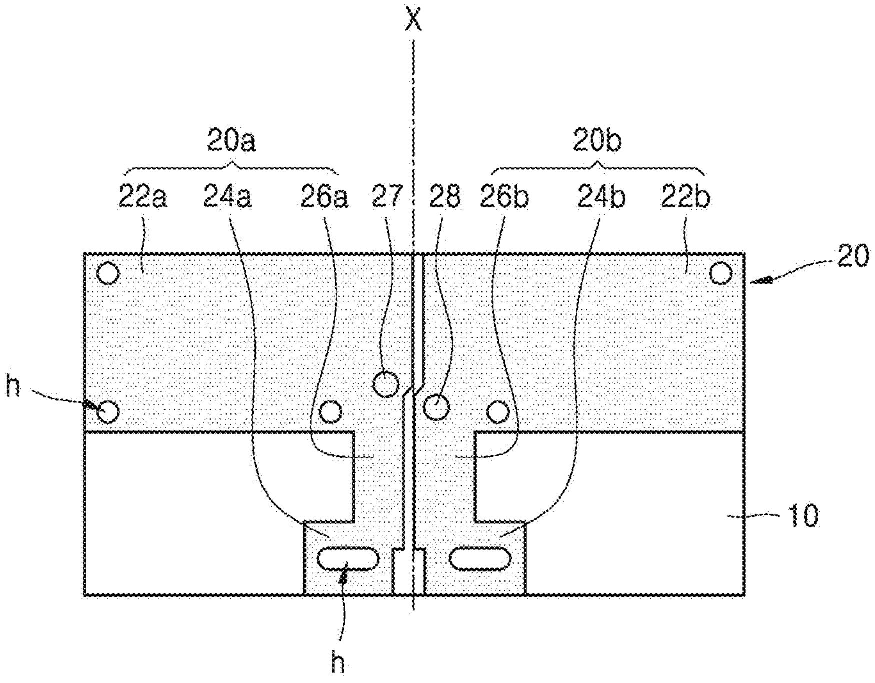
FIG. 11 is a diagram illustrating a radiation pattern including holes, according to an embodiment of the disclosure.

FIG. 11 is a diagram illustrating a radiation pattern including holes h, according to an embodiment of the disclosure.

Referring to FIG. 11, the radiation pattern 20 may include one or more holes h. The hole h may be circular or elliptical. However, it is not limited thereto. The shape of the hole h may be polygonal, elliptical, circular, or a combination thereof. An antenna according to an embodiment may include a bent radiation pattern.

Figure 12:
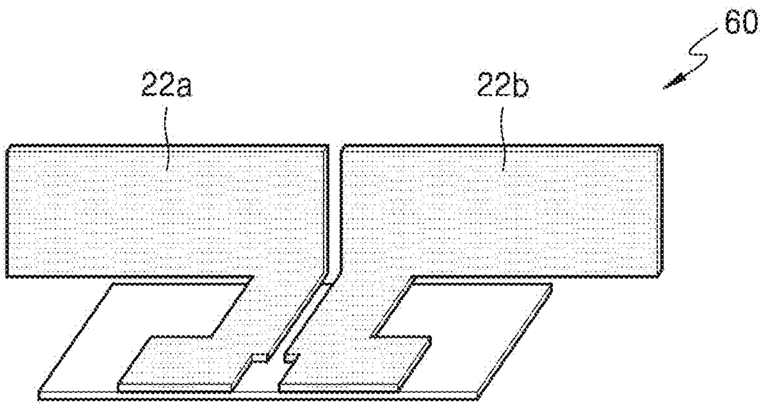
FIG. 12 is a diagram illustrating a bent radiation pattern according to an embodiment of the disclosure.

FIG. 12 is a diagram illustrating a bent radiation pattern according to an embodiment of the disclosure. Radiation regions in a radiation pattern 60 that do not overlap the coupling pattern 30 may be bent one or more times.

Referring to FIG. 12, the first radiation regions 22*a* and 22*b* in the radiation pattern 60 may be bent and positioned perpendicular to the third radiation regions 26*a* and 26*b*. The overall dimensions of the antenna 1 may be adjusted by bending the radiation pattern 20. In addition, communication performance may be improved by bending the antenna 1. The radiation pattern 60 may be bent in regions that do not overlap the coupling pattern. In an example, bending may also occur in the third radiation regions 26*a* and 26*b*.

Figure 13:
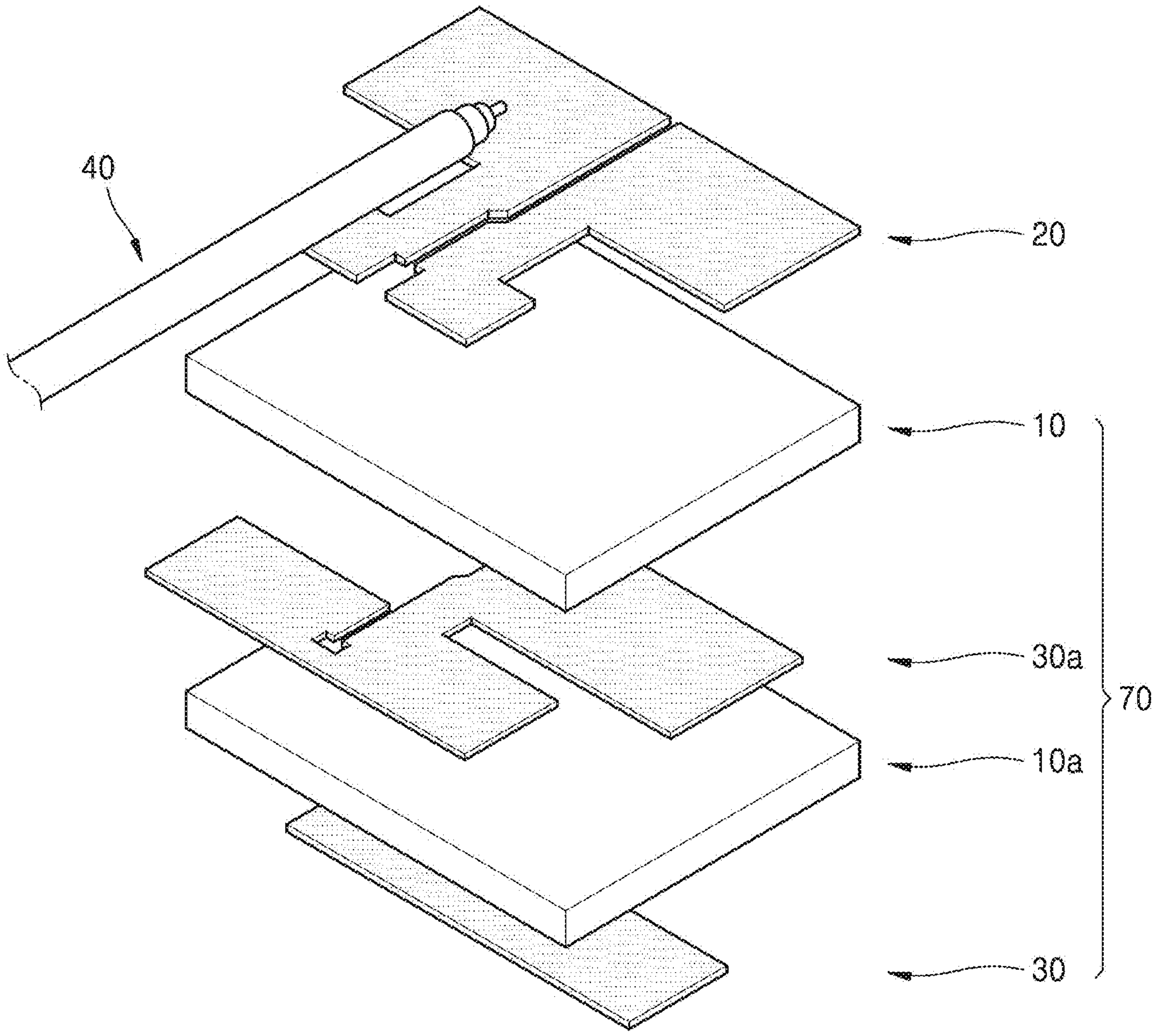
FIG. 13 is a diagram illustrating an antenna including a plurality of coupling patterns, according to an embodiment of the disclosure.

FIG. 13 is a diagram illustrating an antenna including a plurality of coupling patterns, according to an embodiment of the disclosure.

Referring to FIG. 13, a coupling pattern 70 may include first and second coupling patterns 30*a* and 30, and further include a substrate 10*a* between the first and second coupling patterns 30*a* and 30. In an embodiment, the plurality of coupling patterns 30*a* and 30 may be used to further mitigate signal imbalance in the antenna 1. The coupling pattern is merely an example, and other forms of coupling patterns may be applied.

Figure 14:
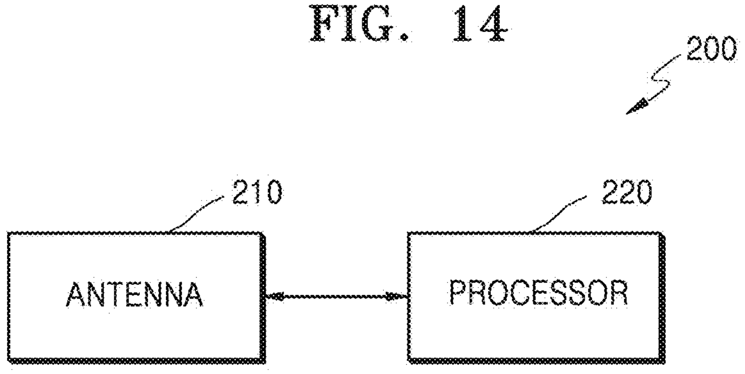
FIG. 14 is a block diagram illustrating an antenna apparatus according to an embodiment of the disclosure.

FIG. 14 is a block diagram illustrating an antenna apparatus according to an embodiment of the disclosure.

As described with reference to FIG. 1, an antenna apparatus 200 shown in FIG. 14 may be installed in a region inside or outside a vehicle.

The vehicular antenna apparatus 200, according to the embodiment of the disclosure, is an antenna apparatus installed in the vehicle for wireless communication between the vehicle and an external device, and transmits and receives radio waves via the above-described antenna.

In another embodiment, the vehicular antenna apparatus 200 according to the embodiment of the disclosure may be an antenna apparatus that performs wireless communication in a predetermined frequency band. A frequency band used for wireless communication may vary depending on a communication standard or type of communication to be used.

In addition, the vehicular antenna apparatus according to the embodiment of the disclosure may be formed integrally with a vehicular communication module (not shown). The vehicular communication module may be referred to as a transmission control unit (TCU). A TCU is a component that controls transmission and reception of data through wireless communication within the vehicle, and may be responsible for communication between the vehicle and external electronic devices (e.g., a server, a mobile device, etc.). The antenna apparatus, according to the embodiment of the disclosure, may be installed inside the vehicular communication module or integrated with the vehicular communication module.

Referring to FIG. 14, the vehicular antenna apparatus 200 includes an antenna 210 and a processor 220. The antenna may include the antenna described above. The antenna may be a single antenna or an array antenna.

In an embodiment, the antenna may transmit and/or receive radio signals. Specifically, the antenna according to an embodiment may transmit and/or receive non-directional radio signals. However, when the antenna includes a plurality of antennas, radio signals output from the antennas may be transmitted or received in a desired direction. When the array antenna 210 has a directivity to transmit or receive radio signals in a desired direction, the output radio signals having a directivity may be referred to as a beam.

In another embodiment, the processor 220 executes at least one instruction to perform operations according to an embodiment of the disclosure. That is, the processor 220 may execute at least one instruction to control an intended operation to be performed.

In an example, the processor may obtain information from an external device by adjusting a phase of at least one radio signal output from the antenna. The processor 220 may control driving of the vehicle based on the obtained information. Furthermore, the processor 220 may control the antenna to emit a specific beam based on vehicle driving information.

In another example, the processor 220 may include an internal memory (not shown) and at least one processor (not shown) for executing stored at least one program. Here, the internal memory of the processor 220 may store one or more instructions. Furthermore, the processor 220 may execute at least one of the one or more instructions stored in the internal memory to perform a certain operation.

The processor 220 may include random access memory (RAM) (not shown) that stores signals or data input from outside or is used as a storage area corresponding to various operations performed by the antenna apparatus 200, read-only memory (ROM) (not shown) storing a plurality of instructions and/or a control program for controlling the antenna apparatus 200, and at least one processor (not shown).

Alternatively, the processor 220 may be implemented as a system on chip (SOC) in which a core (not shown) is integrated with a graphics processing unit (GPU). Alternatively, the processor 220 may include more than a single core, i.e., multiple cores. For example, the processor 220 may include dual-core, triple-core, quad-core, hexa-core, octa-core, deca-core, dodeca-core, hexadeca-core, etc.

The processor 220 may include components for implementing a hardware platform (e.g., an application processor (AP), a memory, etc.) and components for implementing a software platform (an operating system (OS) program, automotive safety software for controlling a phase of a radio signal output from the array antenna 210, an application, etc.).

In addition, at least one of the operations performed by the processor 220 may be performed using artificial intelligence (AI) technology.

Figure 15:
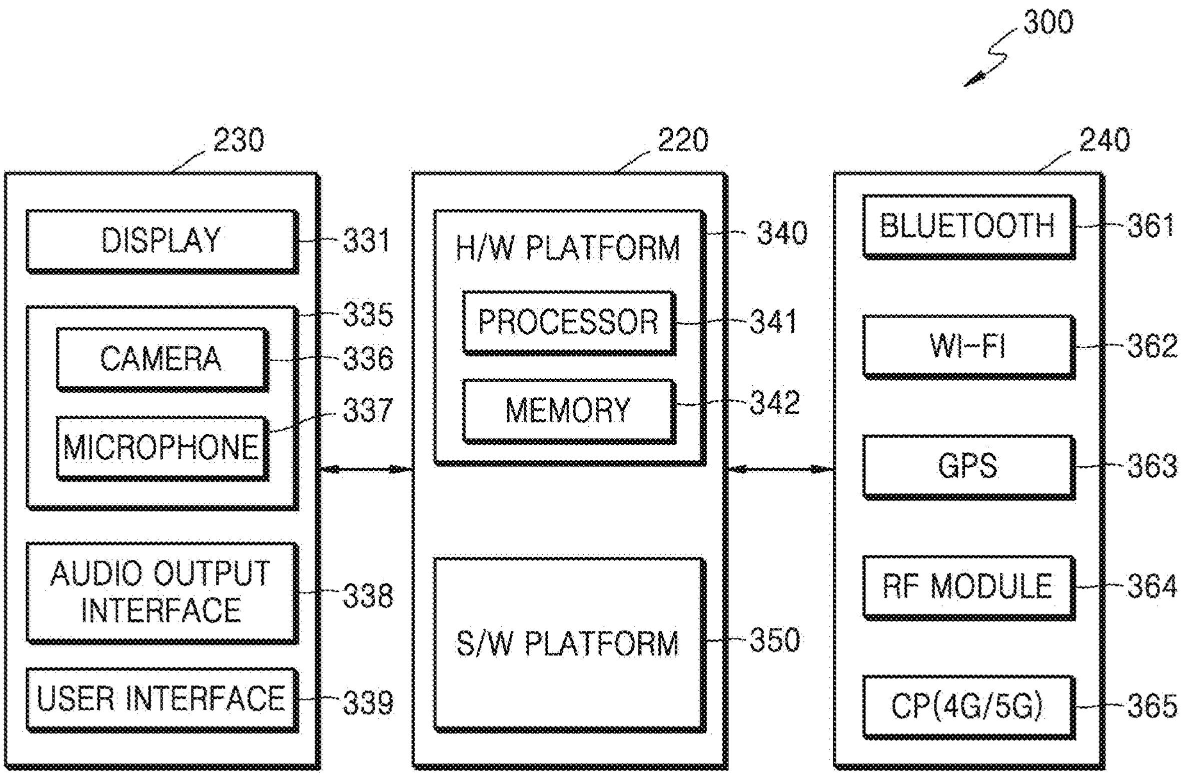
FIG. 15 is a block diagram illustrating a vehicular electronic device including an antenna apparatus of FIG. 14 according to an embodiment of the disclosure.

FIG. 15 is a block diagram illustrating a vehicular electronic device including the antenna apparatus of FIG. 14 according to an embodiment of the disclosure.

A vehicular electronic device 300 of FIG. 15 may include the vehicular antenna apparatus 200 described with reference to FIG. 14. In another embodiment, the vehicular electronic device 300 may represent a computing device that is formed integrally with the vehicular antenna apparatus 200 and is installable within a vehicle. Descriptions of the vehicular electronic device 300 overlapping descriptions of the vehicular antenna apparatus 200 will be omitted below. Furthermore, in the vehicular electronic device 300 of FIG. 15, the same components as those shown in FIG. 14 are represented by the same reference numerals and names as in FIG. 14.

Referring to FIG. 15, the vehicular electronic device 300 may include the processor 220, an input/output (I/O) interface 230, and a communication interface 240. Specifically, the vehicular electronic device 300 may include the vehicular antenna apparatus 200, and the vehicular antenna apparatus 200 may be integrated with the communication interface 240 that is a TCU that performs communication within the vehicle.

Specifically, the vehicular electronic device 300 may be an electronic device for realizing an in-vehicle infotainment (IVI) technology. In an example, the vehicular electronic device 300 may provide services, information, and/or content customized to a specific user based on user location information. In an embodiment, the vehicular electronic device 300 may be used to obtain information necessary for driving or using the vehicle by performing communication between the vehicle and external devices. Alternatively, the vehicular electronic device 300 may provide services, information, and/or content to a user by performing communication between the vehicle and external devices.

In an embodiment, the processor 220 and the I/O interface 1002 included in the vehicular electronic device 300 may be collectively referred to as an IVI head unit. In addition, the vehicle electronic device 1000 may be placed between central front portions of a driver seat and a passenger seat in the vehicle. The array antenna 210 included in the vehicular electronic device 300 may be installed at a position separated from other components included in the vehicular electronic device 300, and may be connected to the other components via a wired communication interface such as a wired cable, or interconnected via a wireless communication interface.

Also, the communication module 240 may be referred to as a TCU.

A TCU is a component that controls transmission and reception of data within the vehicle, and may be responsible for communication between the vehicle and external electronic devices (e.g., a server, a mobile device, etc.).

In another embodiment, the processor 220 may be composed of components for implementing a hardware platform (e.g., an AP, a memory, etc.) and components 350 for implementing a software platform (an OS program, automotive safety software, an application, etc.).

Specifically, the components for implementing the hardware platform 340 may include at least one AP 341 and a memory 342. Here, an example in which the memory 342 is included in the processor 220 has been described. In addition, the memory 420 may not be included in the processor 220 but be included as a separate component included in the vehicular electronic device 300.

The components for implementing the hardware platform may further include a universal serial bus (USB) module (not shown), a frequency modulation (FM)/digital multimedia broadcasting (DMB) tuner (not shown), etc. The USB module may include a USB insert (not shown) to read data from an inserted USB drive. The FM/DMB tuner may selectively receive an FM/DMB broadcasting signal. In detail, the FM/DMB tuner may tune and select only a frequency of a channel desired to be received by the vehicular electronic device 300 from among many radio wave components through amplification, mixing, resonance, etc. of a broadcasting signal received wirelessly. The broadcast signal received by the FM/DMB tuner may include audio, video, and additional information (e.g., an electronic program guide (EPG)).

The components 350 for implementing the software platform may include an OS program, automotive safety software, an application, etc. The OS program may include a QNX, Linux, or Android-based OS program.

The I/O interface 230 is a component for providing data to the user or receiving a user request, and may include at least one of a display 331, a camera module 335, an audio output interface 338, and a user interface 339.

In an embodiment, the camera module 335 is a component for obtaining image and/or audio data, and may include a camera 336 and a microphone 337. The camera module 335 may further include a speaker (not shown) to output an operation sound of the camera 336, etc. Furthermore, when the camera module 335 does not include a separate speaker (not shown), operation sounds of the camera 336 may be output via the audio output interface 338.

For example, the camera module 335 may operate as a detection sensor for recognizing a user's gesture and voice.

In detail, the camera 336 may receive an image (e.g., consecutive frames) corresponding to a user's motion including his or her gesture within a recognition range of the camera 336. In an example, the recognition range of the camera 336 may be within 0.1 m to 5 m from the camera 336 to the user. The user's motion may include, for example, a motion of a user's body part or a part of the user, such as a user's face, facial expression, hand, fist, and finger, etc. In another embodiment, the camera 336 may convert the received image into an electrical signal for recognition according to control by the processor 220, and the processor 220 may select a menu displayed in the vehicular electronic device 300 based on a recognition result corresponding to the user's motion or perform control corresponding to the recognition result. In another example, the processor 220 may control channel selection, channel change, volume adjustment, execution of available services, etc., by using the recognition result obtained from the camera 336.

The camera 336 may be implemented integrally with or separately from the vehicular electronic device 300. In an embodiment, the separated camera 336 may be electrically connected to the processor 220 of the vehicular electronic device 300 via the communication interface 240 or the I/O interface 230. For example, when the camera 336 is implemented separately from the vehicular electronic device 300, the camera 336 may be positioned at a location corresponding to a front of a driver's face and upper body to capture images corresponding to the driver's face and upper body.

The microphone 337 may be configured to receive an audio signal such as a voice signal, etc. The microphone 337 may receive a user's voice signal, and the processor 220 may recognize a control command corresponding to a voice received from the microphone 337 and control an operation corresponding to the control command to be performed. In addition, the microphone 337 may be included in the vehicular electronic device 300 as a separate module instead of being included in the camera module 335.

The user interface 339 may receive a user input for controlling the vehicular electronic device 300. The user interface 339 may include a push button, a wheel, a keyboard, a jog dial, a touch panel, and a haptic sensor, etc., for receiving a user input.

The communication interface 240 may be configured to include at least one communication module for performing wireless communication. In detail, the communication interface 240 may include at least one of a Bluetooth module 361, a Wi-Fi module 362, a global positioning system (GPS) module 363, a radio frequency (RF) module 364, and a communication processor (CP) module 365. Here, the CP module is a modem chipset and may communicate with an external electronic device via a communication network conforming to a third-generation (3G), fourth-generation (4G), 5G, or sixth-generation (6G) communication standard. In addition, the communication interface 240 may further include at least one communication module (not shown) for performing communication according to communication standards such as Bluetooth Low Energy (BLE), near field communication (NFC)/RF identification (RFID), Wi-Fi Direct (WFD), ultra-wideband (UWB), and/or ZigBee.

An antenna according to an embodiment may be one component of a communication module included in the communication interface 240. For example, the antenna may be included in at least one of the RF module 364 and the CP module 365 to transmit and receive radio waves for each of the RF module 364 and the CP module 365.

Components included in the vehicular electronic device 300, e.g., the processor 220, the I/O interface 230, and the communication interface 240, may communicate with one another over a vehicular network. In addition, the vehicular electronic device 300 may communicate with other components in a vehicle (not shown) over a vehicular network. The vehicular network may be a network conforming to a controller area network (CAN) and/or a media oriented systems transport (MOST).

The processor 220 may control driving of the vehicle based on information received from the antenna.

Figure 16:
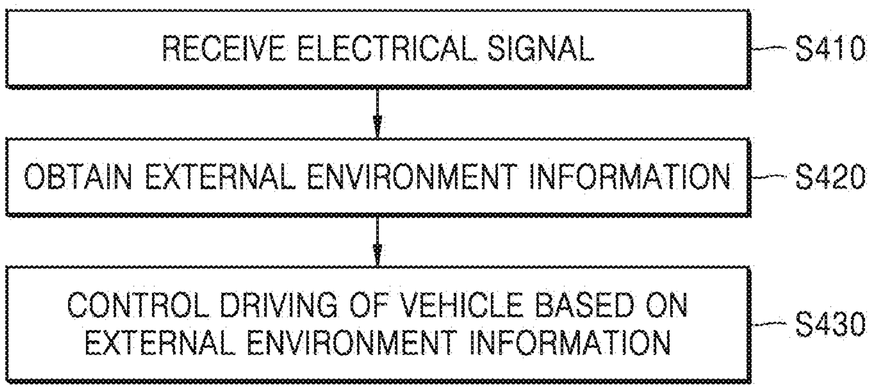
FIG. 16 is a flowchart illustrating a method of controlling the driving of a vehicle by using an antenna, according to an embodiment of the disclosure.

FIG. 16 is a flowchart illustrating a method of controlling the driving of a vehicle by using an antenna, according to an embodiment of the disclosure.

Referring to FIG. 16, the processor 220 may receive an electrical signal from an antenna at operation S410. As described above, the antenna may include a substrate, and a radiation pattern and a coupling pattern spaced apart from each other with the substrate therebetween. The antenna may output an electrical signal corresponding to a received radio signal.

The processor 220 may obtain environment information from the electrical signal received from the antenna at operation S420. The environment information may be traffic information, construction information, accident information, weather information, external object information, etc.

In another embodiment, the processor 220 may control driving of the vehicle in response to the environment information at operation S430. The processor 220 may control a driving unit to change at least one of a travel path and a driving speed of the vehicle in response to the environment information. Although not shown, the driving unit may include a steering control unit, a speed control unit, etc. A vehicle control manual matched with the environment information may be prestored in a memory (not shown). The processor 220 may control driving of the vehicle by reading, from the memory, a vehicle control manual matched with the environment information. However, it is not limited thereto. The processor 220 may control driving of the vehicle corresponding to the environment information by using a learning network model from an AI system. For example, the processor 220 may control driving of the vehicle to prevent a collision with an accident vehicle.

Although it has been described that the antenna according to an embodiment is installed in the vehicle, it is not limited thereto. The antenna may be installed in a device requiring wideband communication.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A vehicular antenna installed in a vehicle, the vehicular antenna comprising:
- a substrate;
- a dipole-type radiation pattern disposed on a first surface of the substrate and configured to transmit or receive a radio signal; and
- a coupling pattern disposed on a second surface opposite to the first surface of the substrate and electromagnetically coupled to the dipole-type radiation pattern,
- wherein the dipole-type radiation pattern includes first and second radiation patterns spatially spaced apart from each other,
- wherein each of the first and second radiation patterns includes:
  - a first radiation region having a first area,
  - a second radiation region having a second area smaller than the first area, and
  - a third radiation region having one end in contact with the first radiation region and another end in contact with the second radiation region,
  - a feeding point disposed on the first radiation region of the first radiation pattern, and
  - a ground point disposed on the first radiation region of the second radiation pattern,
- wherein the coupling pattern is disposed to overlap portions of the first and second radiation patterns and not to overlap at least a portion of the first radiation region of each of the first and second radiation patterns in a thickness direction of the substrate,
- wherein the first radiation region of the first radiation pattern and the first radiation region of the second radiation pattern, the second radiation region of the first radiation pattern and the second radiation region of the second radiation pattern, and the third radiation region of the first radiation pattern and the third radiation region of the second radiation pattern are spatially spaced apart from each other, and
- wherein a distance between the second radiation region of the first radiation pattern and the second radiation region of the second radiation pattern is greater than a distance between the first radiation region of the first radiation pattern and the first radiation region of the second radiation pattern.

2. The vehicular antenna of claim 1, wherein the entire second radiation region of the first radiation pattern and the entire second radiation region of the second radiation pattern overlap the coupling pattern in the thickness direction of the substrate.

3. The vehicular antenna of claim 1, wherein a width of the third radiation region is less than each of a width of the first radiation region and a width of the second radiation region.

4. The vehicular antenna of claim 1, wherein the coupling pattern includes:
- a first coupling region overlapping the second radiation region of the first radiation pattern;
- a second coupling region overlapping the second radiation region of the second radiation pattern; and
- a third coupling region having one end in contact with the first coupling region and another end in contact with the second coupling region.

5. The vehicular antenna of claim 4, wherein the coupling pattern further includes a first slot that spatially separates the first coupling region from the second coupling region.

6. The vehicular antenna of claim 5, wherein the first slot corresponds to a distance between the first radiation pattern and the second radiation pattern.

7. The vehicular antenna of claim 1, wherein the coupling pattern further includes one or more second slots.

8. The vehicular antenna of claim 7, further comprising:
- one or more slot adjustment elements connected to the coupling pattern across the second slot.

9. The vehicular antenna of claim 8,
- wherein the one or more slot adjustment elements include at least one of an inductor, a capacitor, a switching element, and an impedance tuner, and
- wherein the one or more slot adjustment elements are configured to control a length of the second slot.

10. The vehicular antenna of claim 1,
- wherein a distance between the ground point and a second radiation region of the second radiation pattern is less than a distance between the feed point and the second radiation region of the first radiation pattern.

11. The vehicular antenna of claim 1, wherein a width of an operating frequency at which a peak gain is −3 dB or more is greater than or equal to 3 GHz, or wherein the peak gain is −3 dB or more in a frequency range of 1.8 GHz to 5 GHz.

12. The vehicular antenna of claim 1, wherein the vehicular antenna is disposed inside the vehicle, wherein the dipole-type radiation pattern is disposed toward an outside of the vehicle, and wherein the coupling pattern is disposed toward an inside of the vehicle.

13. The vehicular antenna of claim 1, further comprising:

a feed line feeding the dipole-type radiation pattern.

* * * * *